R. J. REYNOLDS.
MACHINE FOR CRUSHING COTTON BOLLS.
APPLICATION FILED MAR. 25, 1915.
1,170,847.
Patented Feb. 8, 1916.
2 SHEETS—SHEET 1.
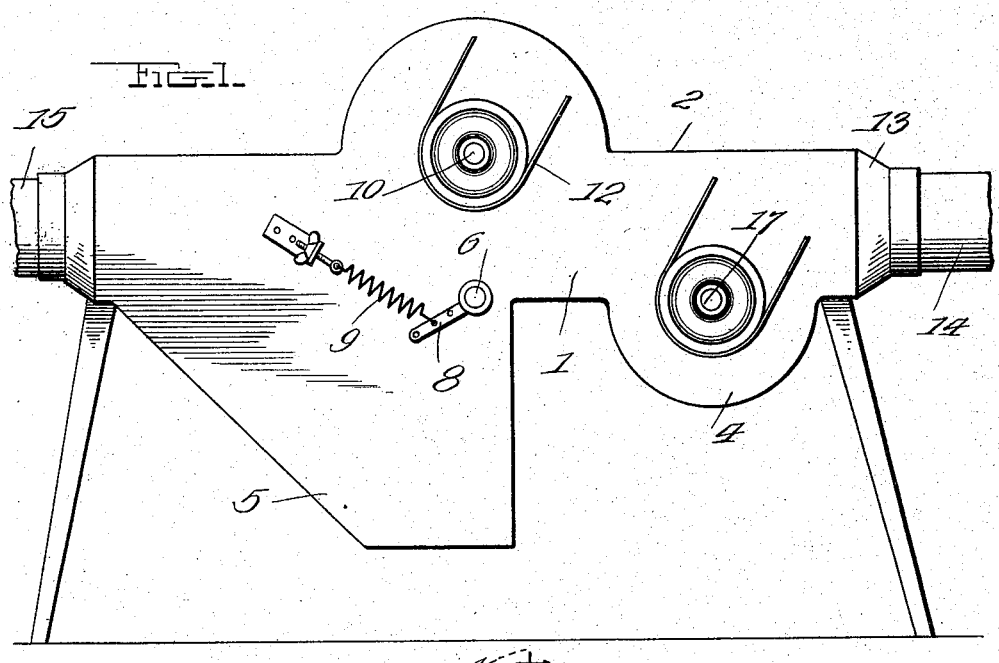
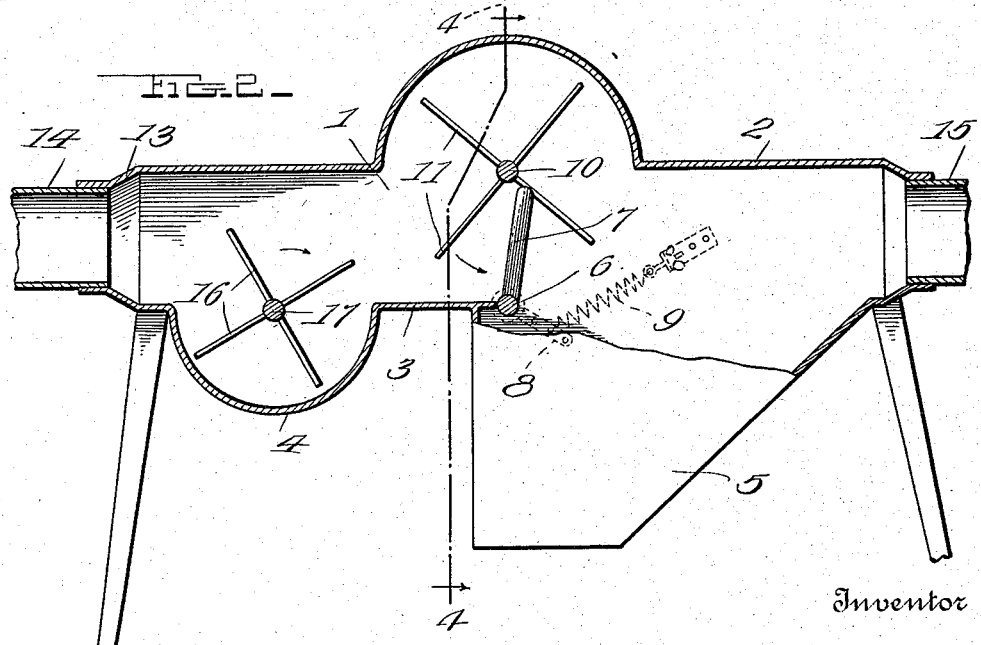
Witnesses
Inventor
R. J. Reynolds.
by
Attorneys R. J. REYNOLDS.
MACHINE FOR CRUSHING COTTON BOLLS.
APPLICATION FILED MAR. 25, 1915.
1,170,847.
Patented Feb. 8, 1916.
2 SHEETS—SHEET 2.
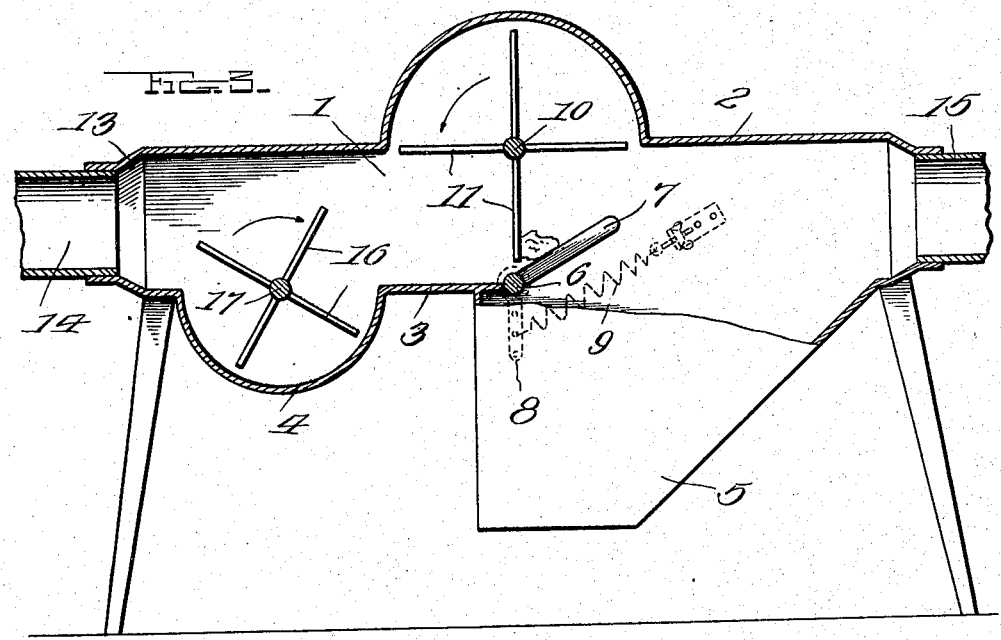
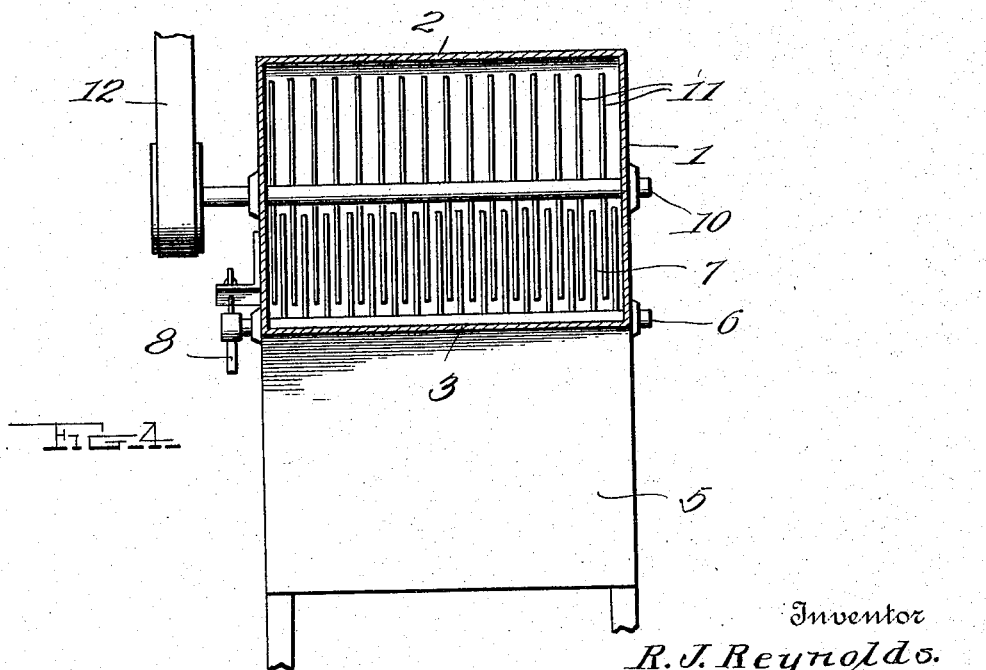
Witnesses
Inventor
R. J. Reynolds.
by
Attorneys

UNITED STATES PATENT OFFICE.

RICHARD J. REYNOLDS, OF TAYLOR, TEXAS, ASSIGNOR OF ONE-HALF TO CARLOS EASLEY, OF TAYLOR, TEXAS.

MACHINE FOR CRUSHING COTTON-BOLLS.

1,170,847.  Specification of Letters Patent.  Patented Feb. 8, 1916.

Application filed March 25, 1915. Serial No. 16,997.

*To all whom it may concern:*

Be it known that I, RICHARD J. REYNOLDS, a citizen of the United States, residing at Taylor, in the county of Williamson and State of Texas, have invented certain new and useful Improvements in Machines for Crushing Cotton-Bolls; and I do declare the following to be a full, clear, and exact description of the invention, such as will enable others skilled in the art to which it appertains to make and use the same.

My invention relates broadly to improvements in machines for the handling of cotton and the like.

The object of the invention is to provide a machine so constructed as to crush the cotton bolls before the cotton is fed to the gin, ample provision being made for preventing rocks and the like which may enter the machine, from injuring the same.

With this general object in view, the invention resides in certain novel features of construction and combination hereinafter described and particularly pointed out in the appended claims.

In describing the invention, I shall refer to the accompanying drawings wherein like reference characters designate corresponding parts throughout the various views and wherein—

Figure 1 is a side elevation of a boll crusher constructed in accordance with my invention; Figs. 2 and 3 are vertical longitudinal sections partly in elevation, showing the different positions of parts; and Fig. 4 is a vertical transverse section as seen along the plane indicated by the line 4—4 of Fig. 2.

In these drawings, constituting a part of the application, the numeral 1 designates a casing rectangular in transverse vertical section provided with a top 2 arched in longitudinal section at its intermediate portion. The bottom 3 of the casing continues from one end thereof to a point beneath the center of the arched portion of the top 2 and is provided with a cylindrical transversely disposed depression 4 between its ends. The space between the inner end of the bottom 3 and the other end of the casing 1 is disposed above any preferred type of hopper or the like 5 within which means for allowing the discharge of rocks, etc., may be disposed, such means however, constituting no part of the present invention and being therefore not illustrated.

Pivoted upon a transverse axis 6 directly above the inner end of the bottom 3, is a comb 7 whose teeth rise from the aforesaid axis, the latter being here shown in the form of a transversely disposed horizontal shaft having a crank arm 8 disposed adjacent the exterior of the casing and adjustably connected to one end of a coil spring 9, the latter being provided with any preferred means for varying its tension. By this disposition of parts, it will be evident that the comb 7 may rock longitudinally within the casing, this being expedient for a purpose to be set forth.

Rotatably mounted immediately above the comb 7, is a transverse driven shaft 10 upon which a plurality of radially disposed spikes 11 are carried, these spikes being so located as to cause them to travel through the spaces between the comb teeth as the shaft 10 is rotated by a belt 12 or the equivalent thereof. Thus these spikes 11 and the shaft 10 form a beater for coaction with the yieldable comb.

The cotton is fed to the receiving end 13 of the casing 1 by a pipe 14 in which, in said casing, and in the delivery pipe 15 at the opposite end thereof, suction is created by any preferred means. This cotton before being fed to the comb 7, is acted upon by the beater which is formed by the spikes 16 and the transverse driven shaft 17 from which they project, said beater being disposed at the top of the depression 4. The result is, that the solid mass of cotton entering the receiving end of the casing 1 is disintegrated to an amount sufficient to allow the spikes 11 to force it through the spaces between the teeth of the comb 7. In so doing, the bolls in the cotton are crushed and the majority of these crushed bolls will then travel through the delivery pipe 15 with the cotton being discharged therethrough to the gin (not shown).

During the normal operation of the machine, the comb 7 is retained in substantially upright position by the spring 9 but in case stones or other objects which cannot be easily crushed by the machine, are fed into the latter, they will of course be forced against the comb 7 by the spikes 11, breakage of these parts being now prevented by the provision of the spring 9 which allows the comb to yield toward the delivery end of the machine until such objects may be forced thereover into the hopper 5.

From the foregoing description, taken in connection with the accompanying illustration, it will be evident that although very simple construction has been provided for reducing the invention to an operative machine, the latter will be efficient in operation and will possess a number of advantageous features. Particular emphasis is laid upon the provision of the comb 7 operating in conjunction with the spikes 11 passing therethrough, and upon the manner in which said comb is mounted, since these features are salient in accomplishing the best results.

In the foregoing, I have described certain specific details of construction for producing probably the best results, and in the accompanying drawings have shown such details, but it will be evident that I need not be limited thereto otherwise than as set forth in the following which I claim as my invention.

I claim:

1. A boll crushing machine comprising a longitudinal passageway, a hopper in the rear end of the bottom thereof, a beater rotatably mounted in the top of said passage over the forward end of said hopper, its arms extending into said passageway, and a yieldably mounted comb disposed at the forward edge of said hopper, its teeth extending across said passageway in a substantially vertical plane and receiving the beater arms therebetween to crush the cotton bolls, said comb moving laterally when a non-crushable substance is brought into contact therewith to deposit said substance in the hopper.

2. A boll crushing machine comprising a casing having a longitudinal passageway therethrough, a hopper in the bottom thereof at the rear end, a beater in the lower part of said casing at the forward end, the arms thereof extending into said passageway, an additional beater disposed above said passage over the forward end of said hopper, its arms extending into said passageway, and a yieldably mounted comb disposed in the vertical plane of the shaft of said last mentioned beater at the forward edge of said hopper, its teeth normally extending across said passageway and coöperating with the arms of said last mentioned beater to crush the cotton bolls, said comb moving laterally when a non-crushable substance is brought into contact therewith to deposit said substance in the hopper.

In testimony whereof I have hereunto set my hand in presence of two subscribing witnesses.

RICHARD J. REYNOLDS.

Witnesses:
T. H. BRUNNER,
A. E. DABNEY.

Copies of this patent may be obtained for five cents each, by addressing the "Commissioner of Patents. Washington, D. C."